US012233516B1

(12) United States Patent
Zinck

(10) Patent No.: US 12,233,516 B1
(45) Date of Patent: Feb. 25, 2025

(54) AUTO-REVERSE RATCHET MECHANISM AND METHOD OF MAKING AND USING SAME

(71) Applicant: Frederick L. Zinck, Glenolden, PA (US)

(72) Inventor: Frederick L. Zinck, Glenolden, PA (US)

( * ) Notice: Subject to any disclaimer, the term of this patent is extended or adjusted under 35 U.S.C. 154(b) by 0 days.

(21) Appl. No.: 18/802,847

(22) Filed: Aug. 13, 2024

(51) Int. Cl.
*B25B 21/00* (2006.01)
*B25F 5/00* (2006.01)

(52) U.S. Cl.
CPC ............ *B25B 21/004* (2013.01); *B25F 5/001* (2013.01)

(58) Field of Classification Search
CPC ..... B25B 13/46; B25B 13/463; B25B 13/465; B25B 13/467; B25B 17/00; B25B 21/00; B25B 21/004; B25F 5/001
See application file for complete search history.

(56) References Cited

U.S. PATENT DOCUMENTS 2,554,990 A 5/1951 Kilness
2,981,389 A 4/1961 Kilness
3,044,591 A 7/1962 Kilness
3,078,973 A 2/1963 Kilness
3,174,597 A 3/1965 Schaedler
3,208,318 A 9/1965 Roberts
3,265,171 A 8/1966 Kilness
3,269,496 A 8/1966 Kilness
3,369,416 A 2/1968 Kilness
3,393,780 A 7/1968 Kilness
3,714,994 A 2/1973 Zoerner
4,106,572 A 8/1978 Anderson
4,211,127 A 7/1980 Tito
4,592,256 A * 6/1986 Bosque .................. B25B 17/00 81/57.13
4,974,475 A 12/1990 Lord
5,562,015 A 10/1996 Zinck
6,330,842 B1 12/2001 Brun
6,446,735 B1 9/2002 Chen
6,568,298 B1 5/2003 Zinck
6,789,447 B1 * 9/2004 Zinck .................... B25B 13/465 81/57.13
7,086,311 B2 8/2006 Liaw
7,107,877 B2 9/2006 Lee
7,836,797 B2 11/2010 Hecht
7,886,840 B2 2/2011 Young
7,963,195 B2 6/2011 Mcroberts (Continued)

*Primary Examiner* — Robert J Scruggs
(74) *Attorney, Agent, or Firm* — Mark T. Vogelbacker; Eckert Seamans Cherin & Mellott, LLC

(57) ABSTRACT

A ratchet mechanism of a reversible tool head can include a driving member extending along a first longitudinal axis. The driving member is configured to be driven by a motor or other power source. A driving head can extend along a second longitudinal axis. The first longitudinal axis extends transversely to the second longitudinal axis. The driving member is configured to operatively connect to the driving head. A pawl positioner can surround a portion of the driving head and can be fixedly attached to the driving head. A pawl can include a plurality of teeth selectively engageable with teeth of the tool head. The pawl positioner can be configured to automatically reposition the pawl relative to the driving head when a rotational drive direction of the driving member is reversed.

19 Claims, 15 Drawing Sheets

(56) References Cited

U.S. PATENT DOCUMENTS

| | | | | |
|---|---|---|---|---|
| 8,051,746 | B2 | 11/2011 | Bouchard | |
| 8,347,979 | B2 | 1/2013 | Young | |
| 8,397,831 | B2 | 3/2013 | Wan | |
| 8,505,648 | B2 | 8/2013 | Elger | |
| 8,739,832 | B2 | 6/2014 | Young | |
| 8,757,031 | B2 | 6/2014 | Su | |
| 8,844,408 | B2 | 9/2014 | Chen | |
| 8,925,646 | B2 | 1/2015 | Seith | |
| 9,038,504 | B2 * | 5/2015 | Pusateri | B25B 13/463<br>81/57.13 |
| 9,061,404 | B2 | 6/2015 | Dohogne | |
| 9,120,213 | B2 | 9/2015 | Elger | |
| 9,149,916 | B2 | 10/2015 | Kiser | |
| 9,193,054 | B2 | 11/2015 | Su | |
| 9,227,308 | B2 | 1/2016 | Wang | |
| 9,266,226 | B2 | 2/2016 | Timmons | |
| 9,296,094 | B2 | 3/2016 | Su | |
| 9,360,060 | B2 | 6/2016 | Su | |
| 9,592,600 | B2 | 3/2017 | Seith | |
| 9,713,866 | B2 | 7/2017 | Su | |
| 9,969,066 | B2 | 5/2018 | Li | |
| 10,131,037 | B2 | 11/2018 | Seith | |
| 10,220,493 | B2 | 3/2019 | Seith | |
| 10,456,895 | B2 | 10/2019 | Ely | |
| 10,919,138 | B2 | 2/2021 | Mattias | |
| 10,926,383 | B2 * | 2/2021 | Scott | B25B 13/465 |
| 11,981,017 | B2 | 5/2024 | Beer | |
| 2010/0043603 | A1 * | 2/2010 | McRoberts | B25B 23/18<br>81/57.11 |
| 2013/0180746 | A1 | 7/2013 | Su | |
| 2020/0061782 | A1 | 2/2020 | Banholzer | |
| 2021/0331297 | A1 | 10/2021 | Schulz | |
| 2022/0379444 | A1 * | 12/2022 | Beer | B25F 5/02 |
| 2023/0286119 | A1 | 9/2023 | Banholzer | |

* cited by examiner

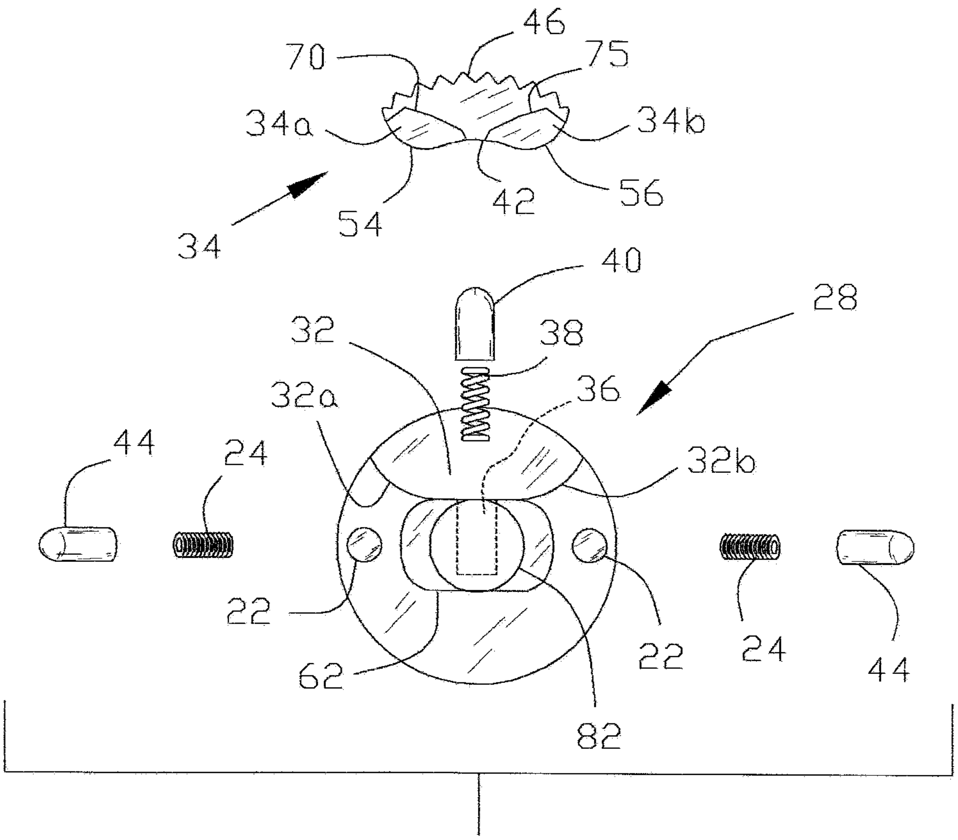
FIG. 14a
FIG. 14b
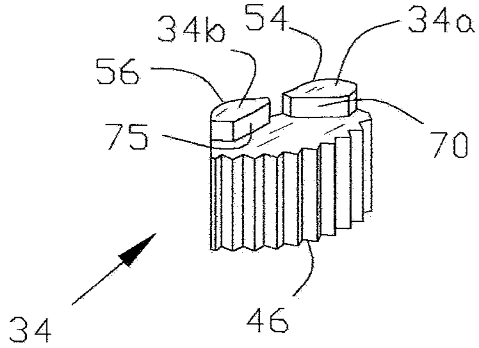

AUTO-REVERSE RATCHET MECHANISM AND METHOD OF MAKING AND USING SAME

FIELD

The presently disclosed technology relates generally to the field of power tools or powered reversible wrenches. More specifically, in one embodiment, the presently disclosed technology is directed to a powered reversible wrench incorporating a bi-directional ratchet mechanism. Optionally, the tool can automatically reverse the ratcheting or driving direction when the rotational direction of the wrench motor reverses for applying torque to a work piece or object.

BACKGROUND

Power wrenches apply torque to fasteners for loosing or tightening. Prior art power wrenches are of either the ratcheting type or the impact type, but not both. Ratcheting type power wrenches require a second hand to actuate a button or knob for reversing its rotational direction. Ratcheting power wrenches utilize an oscillating yoke and are typically slow at around 175 to 300 rpm.

Since torque and speed are inversely proportional, the more torque required the slower the ratchet. Fasteners can easily seize or bottom out, which creates a reaction that can "whip" an operator's hand in a direction opposite the rotational direction of the fastener. This "whipping" effect, and especially in a higher torque ratchet, can easily slam the operator's hand into an obstruction or sharp object potentially causing bodily injury. For this reason, these tools are known in the art as "knuckle busters".

Impact wrenches, on the other hand, are faster and reactionless as torque is not transmitted to the user. However, a larger and more powerful wrench is required for overcoming the resistive torque of the fastener. If the impact wrench cannot overcome the torque of the fastener, another tool such as a breaker bar will be required to overcome the torque of the fastener.

U.S. Pat. No. 9,038,504, which is hereby incorporated by reference, discloses an auto-shift reversing mechanism, which uses linkage to couple a motor and a reversing pawl. This design requires numerous components, each of which are susceptible to breakage. The design of U.S. Pat. No. 9,038,504 also uses an oscillating yoke design with an approximate maximum 300 revolutions per minute. As the oscillating yoke design wears, slippage occurs because tension between the driving head and housing is required for the pawl teeth to engage the next set of teeth on the yoke.

SUMMARY

There is a need to provide an auto-reverse ratchet mechanism. The above and other needs are addressed by the presently disclosed technology.

For example, the presently disclosed technology employs fewer components than the design of U.S. Pat. No. 9,038,504. The presently disclosed technology also does not employ or require coupling linkage or an oscillating yoke. The presently disclosed technology avoids the slippage inherent to the design of U.S. Pat. No. 9,038,504 due to a gear-on-gear design.

In one embodiment, the presently disclosed technology is directed to a ratchet mechanism, and optionally an auto-reverse ratchet mechanism, which can include a pawl positioner rotated by a motor. The pawl positioner can limitedly and concentrically rotate with a driving head for turning a work piece. A ratcheting pawl can be carried in the driving head. The positioner can automatically reposition the pawl relative to the driving head when the rotational drive direction of the motor is reversed. Lost motion is provided when the motor changes direction so that torque from the motor can initially be applied to the pawl positioner for repositioning the ratcheting pawl before forcing rotation of the driving head for turning a work piece. The ratchet mechanism can rotate within an internal gear of a wrench head and the gear has a generally cylindrical opening exposing inwardly formed teeth engageable with the ratcheting pawl. The ratchet mechanism can function in either a conjointly rotational power mode when being powered or a default manual mode when not being powered. During the power mode the pawl can be held radially inward and thus is ratchetably and driveably disengaged from the internal gear and the pawl positioner conjointly rotates the driving head for applying torque to a work piece. When powering is stopped, the ratchet mechanism can default to manual mode, whereby the pawl and internal gear are conjointly engageable for rotating the driving head in the same direction as powering and are engageable for ratcheting the wrench head in the opposite direction from the power/manual driving direction whereby the wrench head ratchetably rotates without rotating the driving head.

In another embodiment, the presently disclosed technology is directed to a ratchet mechanism of a reversible power tool (e.g., a wrench) that automatically reverses a pawl position for driving and/or ratcheting when a rotational direction of a motor of the tool is reversed. The ratchet mechanism can include a pawl positioner limitedly rotatable about a work piece turner carrying a pawl, the combination of which is rotatable in either one or the other of two modes-a conjoint or powering mode whereby the pawl is ratchetably and driveably disengaged from an internal gear to accommodate high speed facilitation in the wrench, and a manual default mode whereby the pawl and gear are driveably engageable for manual driving in the same direction as powering mode or ratchetably engageable in a direction opposite the power/manual drive direction. Both modes are operatively releasable and lost-motioned to a reversed drive/ratchet direction subsequent to the motor drive direction reversal.

In yet another optional embodiment, the presently disclosed technology is directed to ratchet mechanism of a reversible tool head that can include a driving member extending along a first longitudinal axis. The driving member can be configured to be driven by a motor or other power source. A driving head can extend along a second longitudinal axis. The first longitudinal axis extends transversely to the second longitudinal axis. The driving member can be configured to operatively connect to the driving head. A pawl positioner can surround a portion of the driving head and can be fixedly attached to the driving head. A pawl can include a plurality of teeth selectively engageable with teeth of the tool head. The pawl can be urged radially outward toward the teeth of the tool head by a biasing member pushing a pin away from the driving head and into an inner periphery of the pawl. The pawl positioner can be configured to automatically reposition the pawl relative to the driving head when a rotational drive direction of the driving member is reversed.

BRIEF DESCRIPTION OF THE DRAWINGS

The foregoing summary, as well as the following detailed description of the presently disclosed technology, will be better understood when read in conjunction with the appended drawings, wherein like numerals designate like elements throughout. For the purpose of illustrating the presently disclosed technology, there are shown in the drawings various illustrative embodiments. It should be understood, however, that the presently disclosed technology is not limited to the precise arrangements and instrumentalities shown. Rotations will be viewed from the top or plan view, as in FIG. 2. In the drawings:

FIG. 14*a* is an exploded plan view of a pawl and driving head assembly of an embodiment of the presently disclosed technology;

FIG. 14*b* is a perspective view of the pawl shown in FIG. 14*a;*

DETAILED DESCRIPTION

While systems, devices, and methods are described herein by way of examples and embodiments, those skilled in the art recognize that the presently disclosed technology is not limited to the embodiments or drawings described. Rather, the presently disclosed technology covers all modifications, equivalents, and alternatives falling within the spirit and scope of the appended claims. Features of any one embodiment disclosed herein can be omitted or incorporated into another embodiment.

Any headings used herein are for organizational purposes only and are not meant to limit the scope of the description or the claims. Unless specifically set forth herein, the terms "a," "an" and "the" are not limited to one element but instead should be read as meaning "at least one." The terminology includes the words noted above, derivatives thereof, and words of similar import.

Arrows may be shown in some drawings to denote driving, driven, and/or ratcheting members. Thick arrows denote driving members. Thin arrows denote driven members and broken arrows denote ratcheting members.

Figure 1:
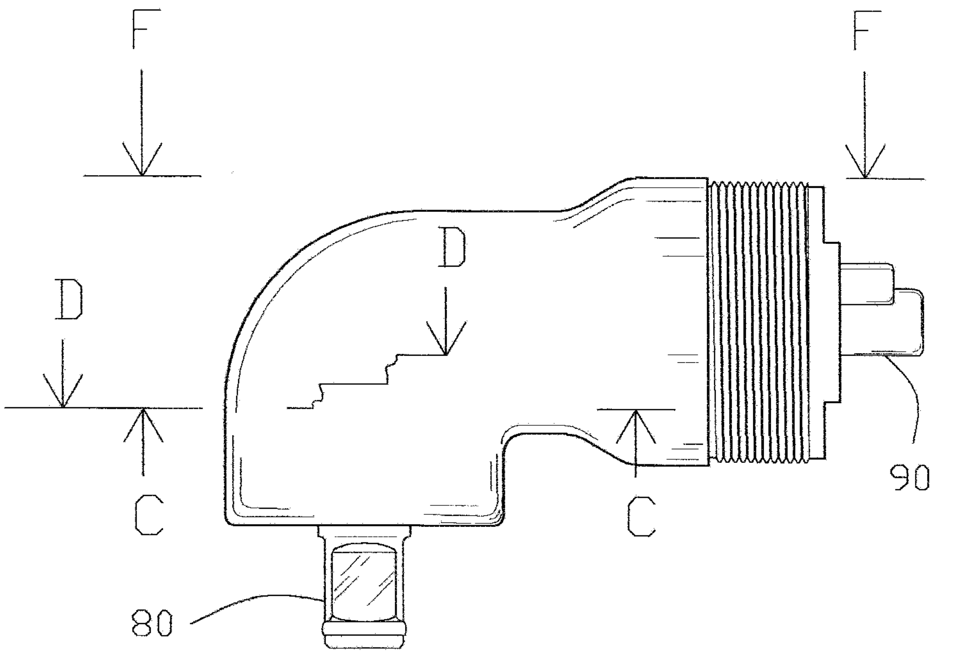
FIG. 1 is a left side elevation view of a head of a tool, such as a power wrench, incorporating an auto-reverse mechanism according to one embodiment of the presently disclosed technology.
Figure 2:
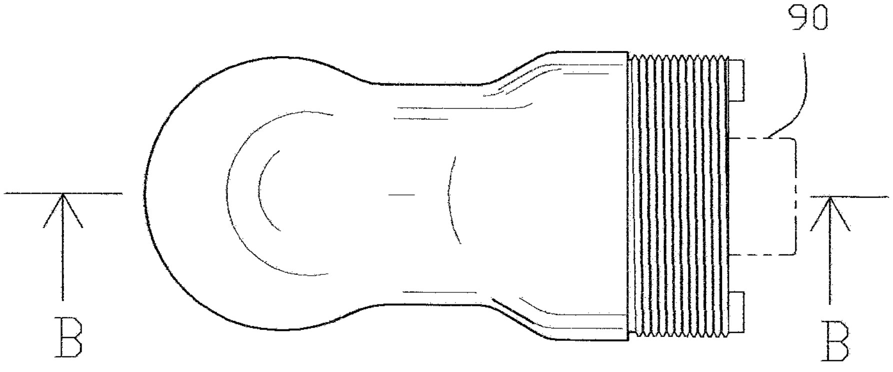
FIG. 2 is a top plan view of the head shown in FIG. 1.
Figure 3:
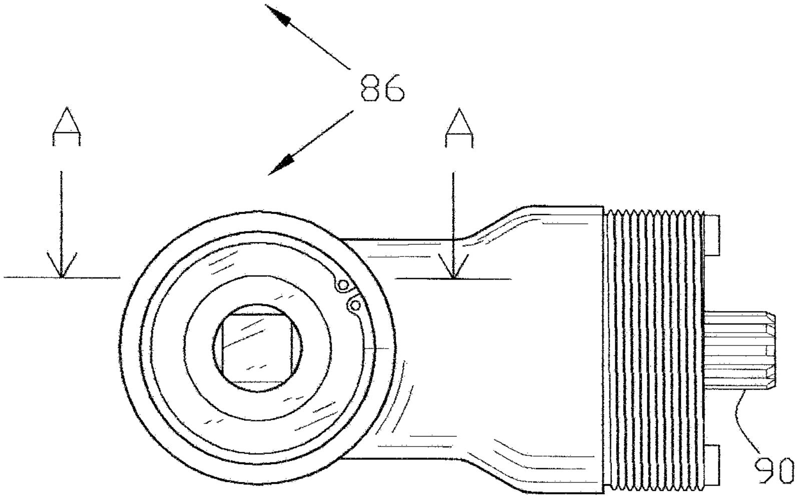
FIG. 3 is a bottom plan view of the head shown in FIG. 1.

Referring now in detail to the various figures, wherein like reference numerals refer to like parts throughout, FIGS. 1-14*b* show an embodiment of a head 86 of a tool, such as a power wrench or a reversible power wrench, according to the presently disclosed technology. The head 86 can include a driving member 90 (optionally referred herein as "driving motor member") (see FIG. 4) therein. In one embodiment, the driving member 90 is configured to link a reversible motor means (not shown) rotationally to a pawl positioner 92 (see FIG. 5). The reversible motor means can include a planetary gear (e.g., see FIG. 3) or an impact driver (e.g., see FIG. 1), for example. In one optional embodiment, a 90 degree gear set can be coupled to a reversible motor or other power source by a clutch, a sun gear set, or a direct drive. The driving member 90 can extend along a longitudinal axis, as shown in FIGS. 1-3.

The driving member 90 is axially and rotationally secured by a pinion bushing or bearing 48 in the head 86. The pawl positioner 92 concentrically rotates a driving head 28 for rotationally driving various work pieces, such as a fastener.

Figure 5:
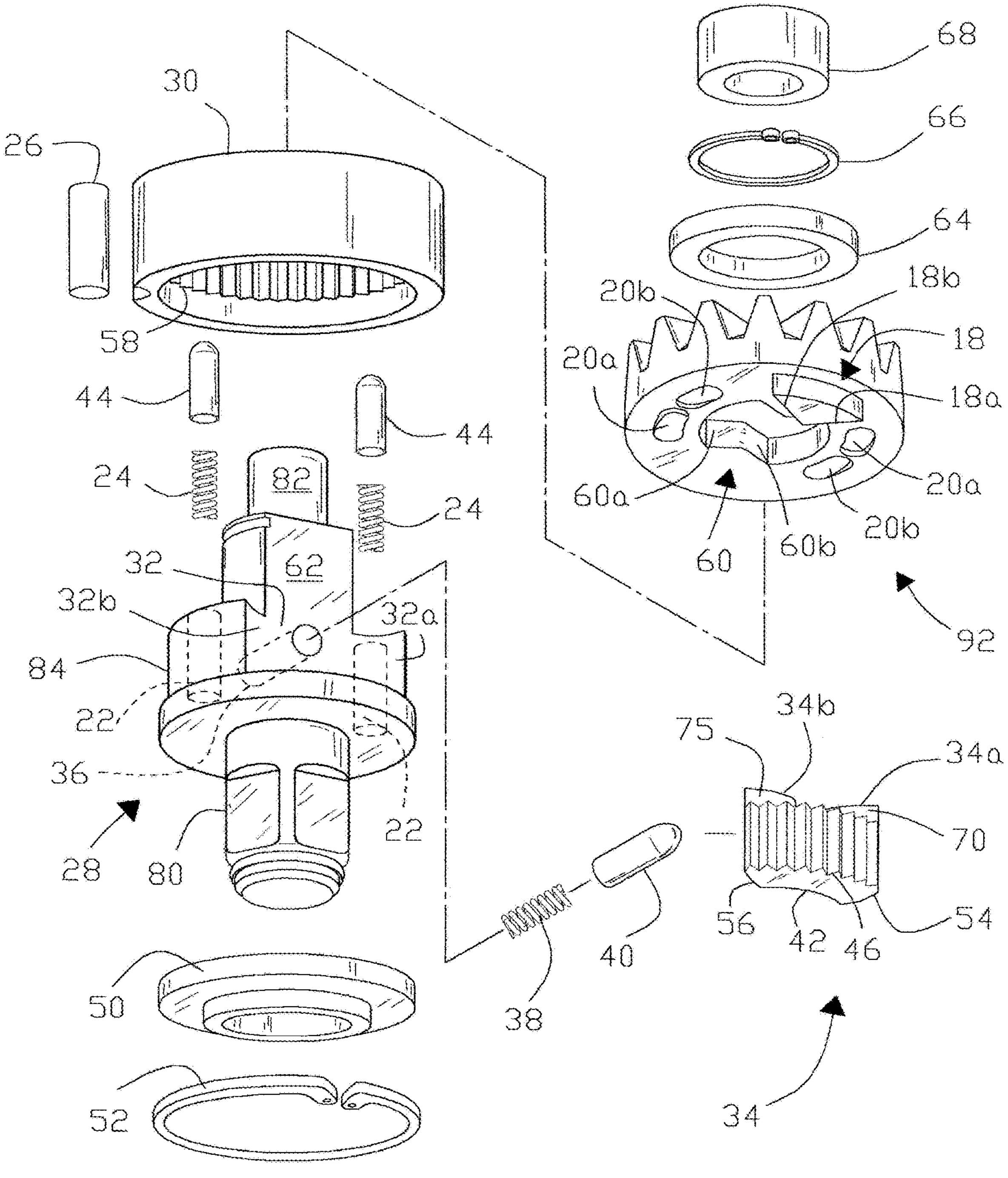
FIG. 5 is a partially exploded perspective view of a ratchet assembly of the head of FIG. 1.
Figure 6:
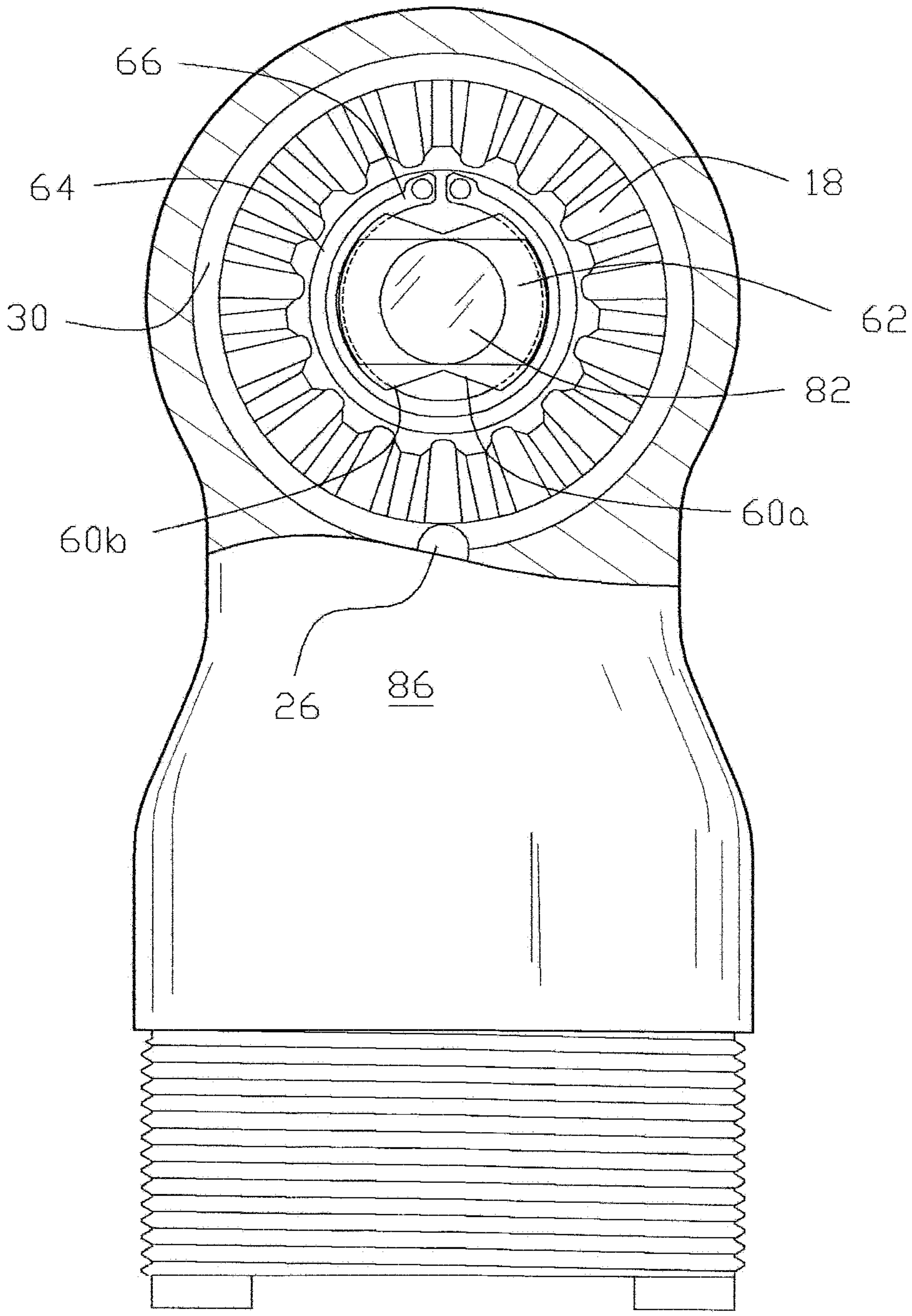
FIG. 6 is a cross-sectional top plan view of the head taken along line F-F of FIG. 1.

As shown in FIG. 5, the driving head 28 includes a body 84 having a longitudinal axis that extends perpendicularly to the longitudinal axis of the driving member 90. The body 84 can include an eccentric pocket wall or face 32 exposed to the body perimeter and/or distinct from a remainder of the perimeter of the body 84.

The head 86 can include and/or the driving head 28 can accommodate at least one arcuate pawl 34 with a plurality of circumferential external teeth 46. The external teeth 46 of the pawl 34 can be configured to matingly engage internal gear teeth 58 of an internal gear 30, as described in detail below. The internal gear 30 can be optionally integral with the head 86, or secured in or to the head 86 in any of a variety of ways, such as by a pin or lockpin 26 (see FIG. 5). In one optional embodiment, the internal gear 30 can be in the shape of a ring. The pawl 34 can be at least slightly smaller radially and laterally than the eccentric pocket wall 32 for lateral and radial play or movement with respect to the driving head 84. A left side pawl abutment face 54 and a right side pawl abutment face 56 on the pawl 34 are suitably formed for distributed load against a left side eccentric pocket wall 32*a* and a right side eccentric pocket wall 32*b*, respectively, or the body 84.

The pawl positioner 92 can include an extension or wedge 18, optionally in the form of an obtuse V-shape, that extends outwardly or downwardly from a planar bottom surface of the pawl positioner 92. The wedge 18 can extend into an upper plane of the eccentric pocket wall 32 of the body 84. The wedge 18 can include a left side wedge face 18*a* and a right side wedge face 18*b*. The left and right side wedge faces 18*a*, 18*b* are configured to fit loosely within a more obtuse v-shaped cutout of the pawl 34 (see FIGS. 14*a* and 14*b*).

As shown in FIGS. 14*a* and 14*b*, the more obtuse v-shaped cutout in the pawl 34 exposes an integral left pawl tang 34*a* and an integral right pawl tang 34*b* at its top lateral limits or extremities. The tangs 34*a*, 34*b* are provided with generally inwardly converging faces, a left side pawl tang face 70 and right side pawl tang face 75 and as such form a greater obtuse angle than the V-shaped wedge 18.

The interactive or interacting relationship of the tang faces 70, 75 to the wedge faces 18*a*, 18*b* are dependent on i) the rotational drive direction of the pawl positioner 92 relative to the driving head 28, and ii) whether in a particular mode, such as a first or powering mode, or a separate second or default manual mode. The pawl tangs 34*a*, 34*b* are manipulatable radially and/or angularly as the pawl 34 is continuously biased or urged radially outward by a biasing member 38 (see FIG. 5) resiliently pushing a pin member 40 out of a recess 36 transverse in the body 84 and into the pawl inner periphery 42 (see FIG. 14*a*). The pin member 40 extends transversely or perpendicularly to the longitudinal axis of the body 84. The tang faces 70, 75 are manipulatable radially and angularly and dependent on the position of the pawl positioner 92 relative to the driving head 28 and their rotational driving direction and also whether the mechanism is in conjoint powering or default manual mode. As will be further explained, the pawl 34 is further manipulated by the interaction of the left side eccentric pocket wall 32*a* to the left side pawl abutment face 54 and of the right side eccentric pocket wall 32*b* to the right side pawl abutment face 56. The inner periphery 42 of the pawl 34 could take another form such as a flat surface.

As shown in FIG. 5, the pawl positioner 92 can include a passageway therethrough or a counterbore 60, optionally having an eccentric shape such as in the shape of a bowtie. The counterbore 60 can include rounded corners. In operation, the pawl positioner 92 concentrically rotates limitedly around an upper shaft 62 above the body 84. The upper shaft 62 has parallel Double-D flats or two opposing flat sides, which limitedly rotate within the counterbore 60 such that rotation reversal of the pawl positioner 92 provides lost-motion relative to the driving head 28 prior to turning the driving head 28 and during which time the pawl 34 is repositioned. In the form shown, the positioner 92 and the upper shaft 62 have relatively sharp edges and alternate embodiments with rounded edges could easily be incorporated to eliminate or at least alleviate stress points, as disclosed in U.S. Pat. No. 8,505,648, which is hereby incorporated by reference.

Figure 4:
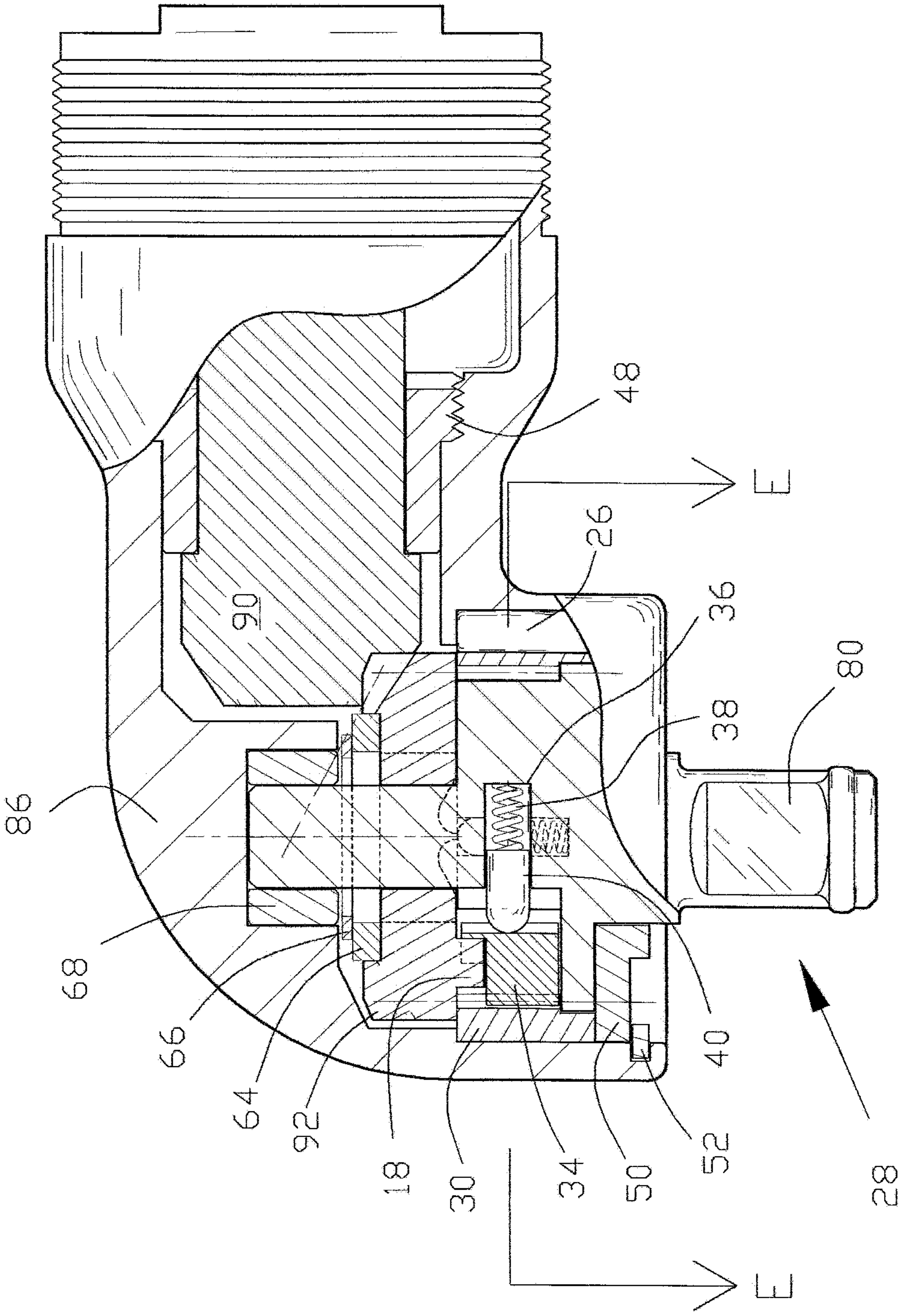
FIG. 4 is a cross-sectional side elevated sectional view of the head taken along line B-B of FIG. 2.

Referring to FIGS. 4 and 5, the pawl positioner 92 is held axially in place, optionally by a pawl positioner drive washer 64 under a retaining ring 66. A smaller diameter shaft 82 extends axially and optionally concentrically above the upper shaft 62 and is rotatably secured in the head 86 by bushing 68. Optionally, the smaller diameter shaft 82 is integrally formed with or attached to the upper shaft 62. In an alternative embodiment, the bushing 68 could be substituted with a roller bearing or the like.

On the opposite end of the driving head 28 is an anvil 80 for driving various work pieces. The anvil 80 can be fixedly attached to and/or integrally formed with the smaller diameter shaft 82 and the upper shaft 62. Thus, in one embodiment, the smaller shaft 82, the upper shaft 62, the body 84, and the anvil 80 integrally form the driving head 28. Optionally, the anvil 80 can be in the form shown as a square drive. However, various other embodiments could be employed, such as a spline or hex.

Figure 13A:
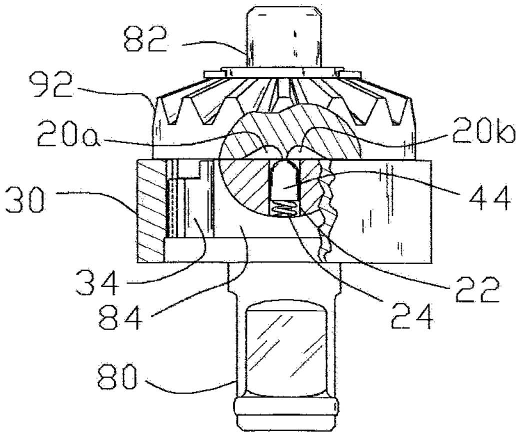
FIG. 13*a* is a partially fragmented left side sectional elevation view of the ratchet assembly taken along line A-A of FIG. 3 and corresponds to FIG. 6.

As shown in FIGS. 4 and 5, the lower end of the driving head 28 is rotatably and axially supported at the bottom of the body 84 by a retaining washer 50 and secured by a retaining ring 52 seated in the head 86. The pawl positioner 92 can include at least one or a pair of angularly elongated slots 20 (see, e.g., FIGS. 15 and 16*d*), where at least one first slot 20*a* is for CCW rotation and at least one second slot 20*b* is for CW rotation. Both of the slots 20*a*, 20*b* are angled and/or have a sloped depth or height. In the form illustrated, slots 20*a*, 20*b* are juxtaposed in the planar bottom face of the pawl positioner 92 and near the top outer surface of the body 84. The slots 20*a*, 20*b* have sloped depth bottoms as shown in FIG. 13*a*, whereby their proximal bottoms are deeper than their distal bottoms. One or more releasable tension pins 44 is biased or urged upwardly by tension pin biasing members 24 (see FIGS. 5 and 13*a*) out of a substantially vertical aperture 22 of the body 84 and into one or the other slot 20*a*, 20*b* for CCW or CW rotation respectively. In one embodiment, a spaced-apart pair of the tension pins 44 can be employed, such that each one of the pair engages one of the slots 20*a*, 20*b*. In another embodiment, the head 86 can include only one of the tension pins 44, which can service both of the slots 20*a*, 20*b*.

The ratchet mechanism of the presently disclosed technology can function as intended with one of the tension pin biasing members 24, one of the apertures 22, one of the tension pins 44, one of the CCW slots 20*a*, and one of the CW slots 20*b*. In the figures, two of each of the above components are shown, although more or fewer of each can be utilized to accomplish the functionality described herein.

Powering Rotation Counterclockwise

Figure 7:
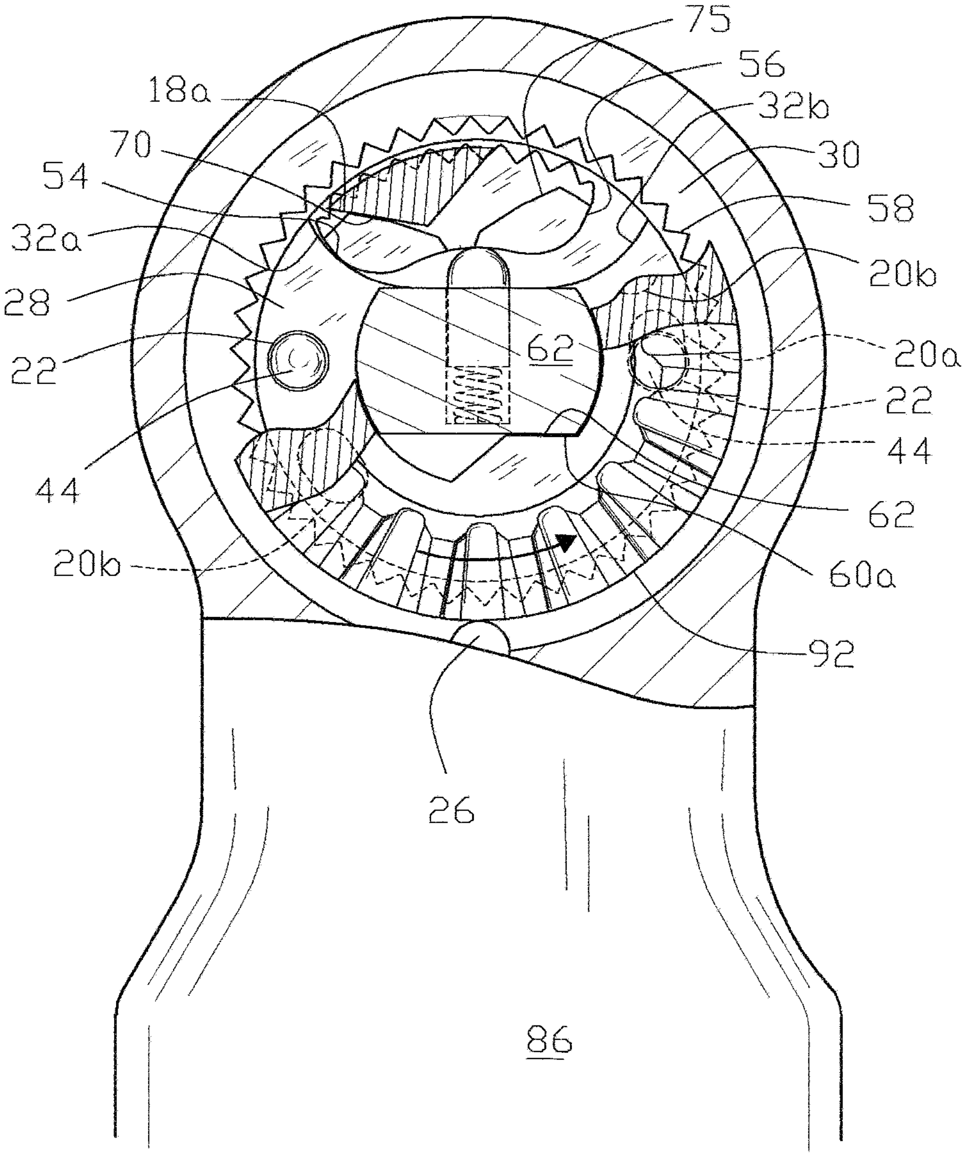
FIG. 7 is a cross-sectional top plan view of the head taken along line D-D of FIG. 1 showing counterclockwise (CCW) powered rotation of the head.
Figure 13B:
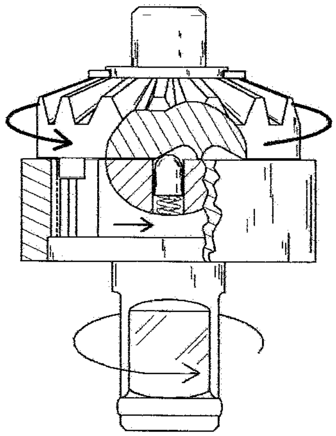
FIG. 13*b* is a partially fragmented left side sectional elevation view of the ratchet assembly taken along line A-A of FIG. 3 for powered CCW rotation and corresponds to FIG. 7.

For powering rotation CCW, FIG. 7 shows the pawl positioner 92 rotationally driven CCW by the driving member 90 (not shown in FIG. 7). As the pawl positioner 92 rotates CCW, CCW parallel bowtie flats 60*a* of the pawl positioner 92 are in contact with the Double-D flats of the upper shaft 62, thereby forcing rotation of the driving head 28. The left side wedge face 18*a* then forces the pawl 34 radially inward at the left pawl tang face 70. The pawl 34 is held radially inward as the left side pawl abutment 54 and the left pawl tang face 70 are interposed between the left side eccentric pocket wall 32*a* and the left side wedge face 18*a*, respectively. The outward tension of the pawl pin 40 is not strong enough to overcome the radially inward holdment of the pawl 34. During this powering mode, the pawl 34 and the internal gear 30 remain disengaged. The releasable tension pin 44 is resting on the shallow sloped distal end of the elongated slot 20*a* as shown in FIG. 13*b*. In this powering mode, a rotational tension moment (opposing torque) is present between the pawl positioner 92 and the body 84, whereby their urged tendency is to rotate in opposite directions until the pin 44 bottoms out in the deep proximal end of slot 20*a*.

Manual Counterclockwise Rotation

Figure 8:
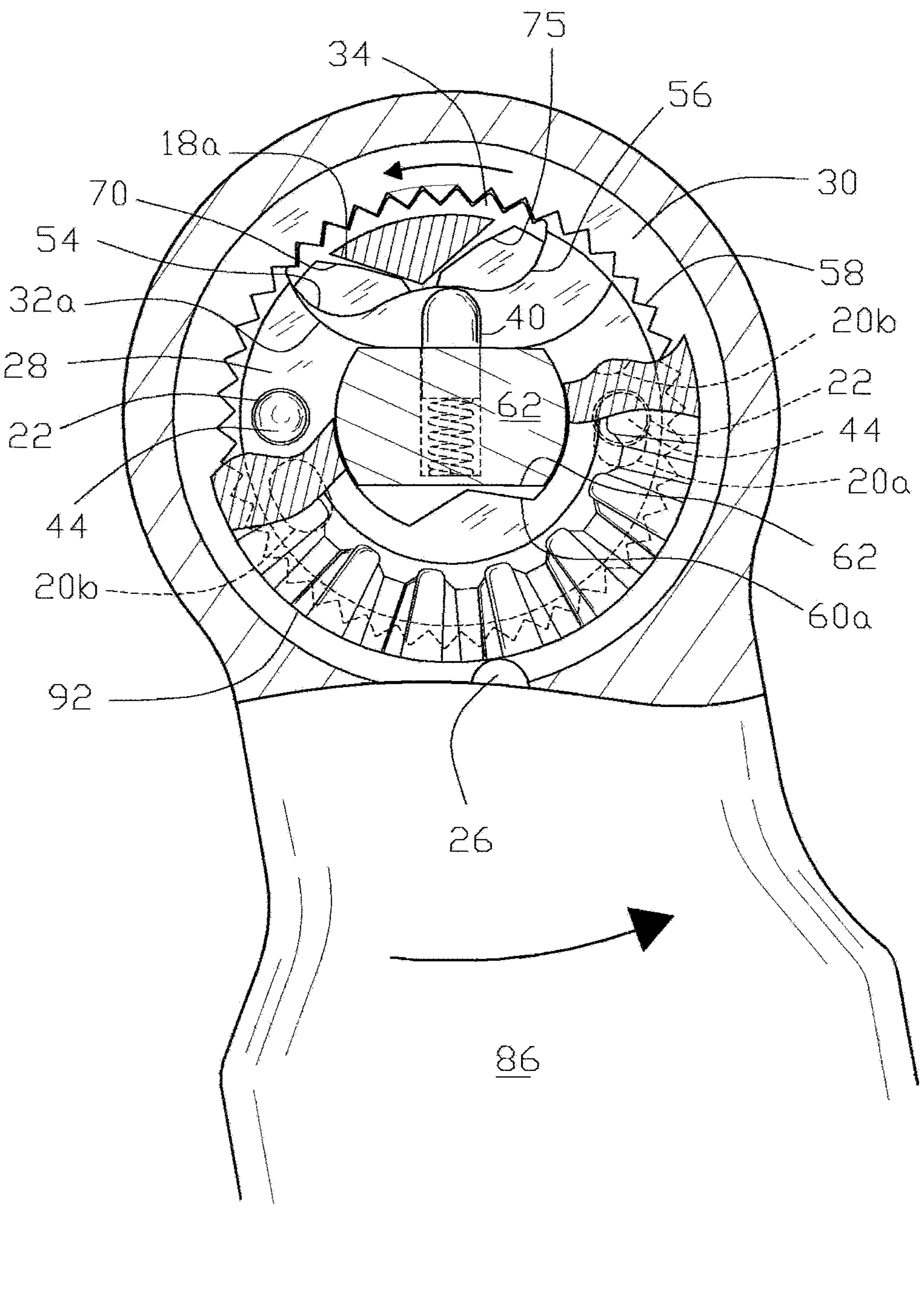
FIG. 8 is a cross-sectional top plan view of the head taken along line D-D of FIG. 1 showing CCW manual rotation of the head.

When CCW powering rotation has stopped, the head 86 can be rotated CCW to force rotation of the driving head 28, as shown in FIG. 8. In operation, the head 86 and/or the internal gear 30 carry the pawl 34 into the left side eccentric pocket wall 32*a*, whereby the left side pawl abutment face 54 is contoured, sized, and/or shaped to exert a distributed load on the left side eccentric pocket wall 32*a* for CCW rotation.

Figure 13C:
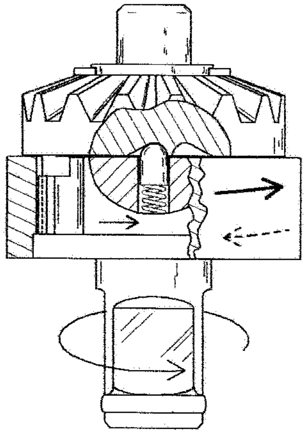
FIG. 13*c* is a partially fragmented left side sectional elevation view of the ratchet assembly taken along line A-A of FIG. 3 for manual CCW rotation or CW ratcheting rotation of the head and corresponds to FIGS. 8 and 9, respectively.

This default manual mode immediately becomes available since the pawl positioner 92 is urged to rotate opposite its driving direction (in this example, CW) as shown in FIG. 13*c* until the upwardly releasable tension pin 44 stops at the proximal deep end of first slot 20*a*. The left side wedge face 18*a* of the pawl positioner 92 rotates also CW, thus forming a gap wide enough between the left side eccentric pocket wall 32*a* and the left side wedge face 18*a* for the left pawl tang 34*a* to slide radially outward and thus the pawl 34 to engage the internal gear 30 for manual CCW rotation.

As mentioned, the pawl 34 can be constantly and/or resiliently biased radially outward from the longitudinal axis of the body 84. For manual CCW rotation, an operator rotates the head 86 CCW. The head 86 with the internal gear 30 carries the pawl 34 against the left side eccentric pocket wall 32*a*. The left side eccentric pocket wall 32*a* and the left side pawl abutment 54 of the pawl 34 are suitably formed to provide a distributed load when abutted for manual driving. An operator can now rotate the head 86 CCW, forcing rotation of the anvil portion 80.

Once powering rotation has stopped the pawl positioner 92 tends to or will rotate opposite its driving direction, as shown further in FIG. 13*c*, until the releasable tension pin 44 slides to the deeper end to bottom out in the proximal deep end of the elongated first slot 20*a*. The parallel bowtie flats 60*a* are close but not contacting the Double-D flats of the upper shaft 62. In this manual mode, sufficient enough clearance is provided between the left side wedge face 18*a* and the left side eccentric pocket wall 32*a* for the pawl 34 and its left pawl tang 34*a* to resiliently extend radially outward and engage the internal gear 30. Right side pawl 34*b* tang is unrestricted.

Pawl 34 is biased radially outward by pawl pin 40, which is tensioned by biasing element 38 protruding from the transverse recess 36 in the body 84. An operator can manually rotate the head 86 CCW and thus rotate the driving head 28 CCW. The pawl 34 is engaged and carried along by the internal gear 30, whereby the left side pawl abutment 54 butts against the compatibly formed left side eccentric pocket wall 32*a* thereby providing a distributed load for forcing rotation of the driving head 28. In this configuration, the pawl positioner 92 drags or follows behind as it is not powered. The releasable tension pin 44 protrudes into the deeper proximal end of the first slot 20*a* and the head 86 can force rotation of the anvil portion 80 CCW. Since the pawl positioner 92 is not powered, it drags or follows along and clearance between the left side eccentric pocket wall 32*a* and the left side wedge face 18*a* is maintained by the releasable tension pin 44 protruding into the deeper proximal end of first slot 20*a*. As the pawl positioner 92 is carried or follows along, enough or sufficient clearance is provided for the pawl 34 to slide radially outward and engage the internal gear 30 and thus manual CCW rotation of the head 86 forces CCW rotation of the driving head 28.

Ratcheting Clockwise

Figure 9:
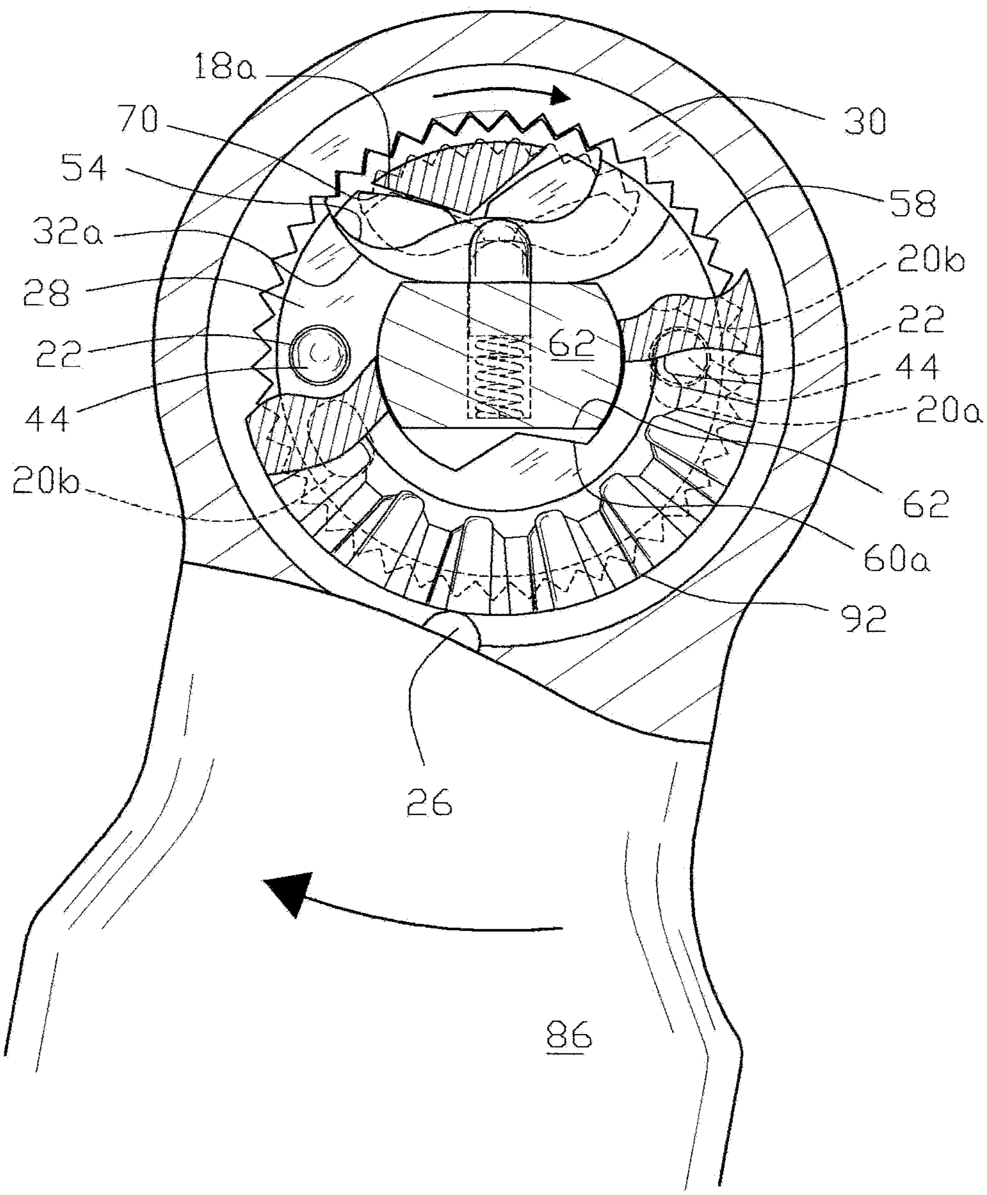
FIG. 9 shows a similar view as that in FIG. 8 where the head is ratcheting clockwise (CW)

Referring to FIG. 13*c*, in the default or manual mode, the relation of the pawl positioner 92 to the body 84 is the same for manual CCW driving or CW ratcheting, whereby the releasable tension pin 44 stays in the deep proximal end of the first slot 20*a*. Situations can exist when the powering mode is insufficient to overcome the work piece resistance and manual rotation by the head 86 is inhibited or obstructed and repositioning of the head 86 is required. In this instance, as shown in FIG. 9 and the dashed arrow of FIG. 13*c*, an operator can ratchet by rotating the head 86 in a CW direction. The releasable tension pin 44 maintains its position in the deep proximal end of first slot 20*a* as the drag or follow of the pawl positioner 92 is not sufficient to release or alter the conjoint positions of the pawl positioner 92 relative to the driving head 28. In this conjoint default position, clearance or separation is maintained enough between the left side pocket wall 32*a* and the left side wedge face 18*a* to allow the biasing element 38 to force the tension pin 40 to protrude from the transverse recess 36 and into the inner concave pawl surface 42 of pawl 34 for internal gear 30 engagement.

As the head 86 and/or the internal gear 30 rotates CW, the pawl 34 is carried or moved along. As the pawl 34 is carried or moved CW, the left pawl tang face 70 contacts the left side wedge face 18*a* and continued rotation forces the pawl teeth 46 of the pawl 34 to temporarily disengage from the internal gear teeth 58 of the internal gear 30 by sliding radially inward over the gear teeth 58 and back out again. This temporary disengagement/engagement of the pawl teeth 46 and the gear teeth 58 provide the ratcheting effect. The parallel bowtie flats 60*a* are close but not touching the Double-D flats of the upper shaft 62 as in FIG. 9 for manual CCW rotation. Once the desired ratcheting position is reached, an operator can rotate the head 86 for further CCW manual rotation of the driving head 28.

Reversing for Clockwise Powering and/or Manual Rotation

Figure 10:
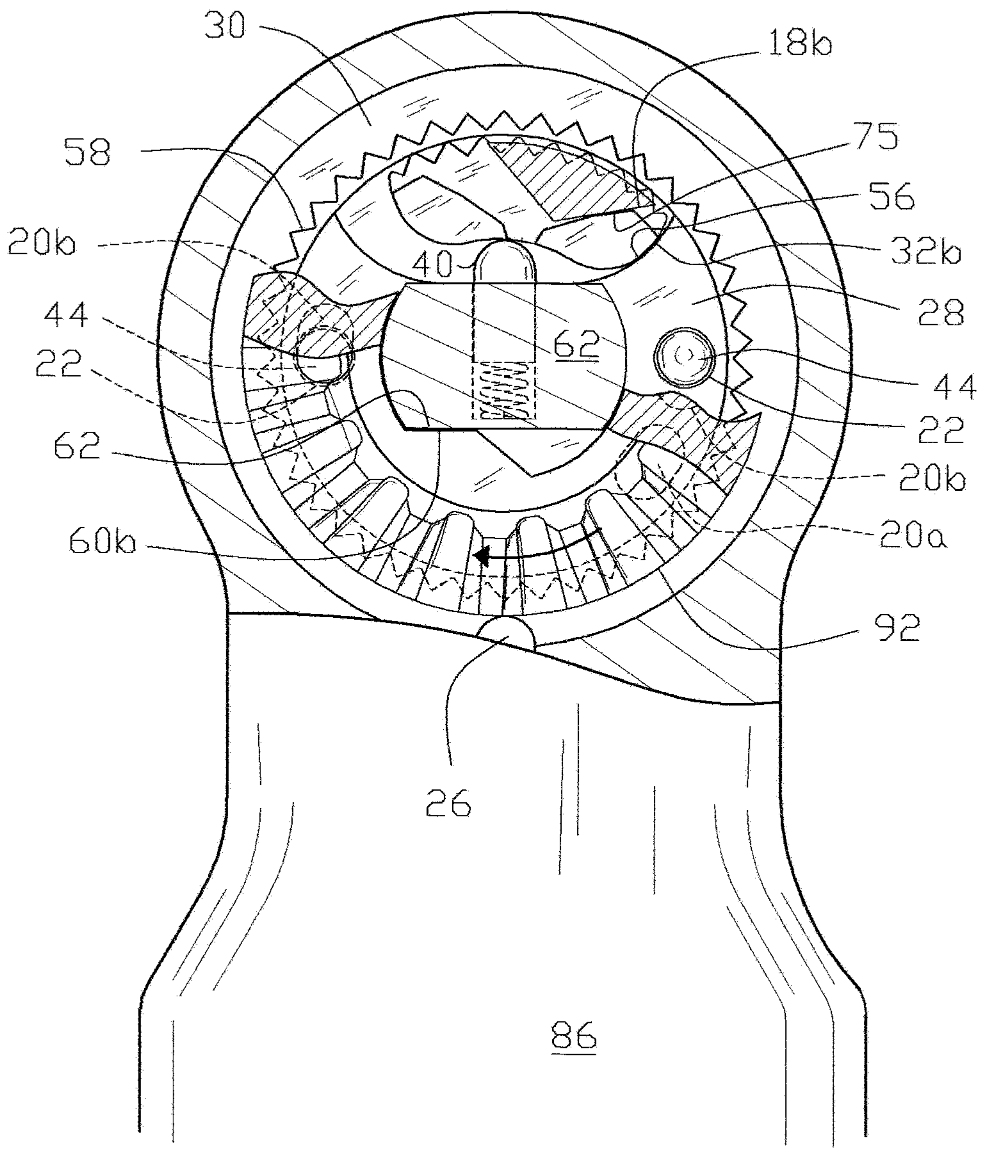
FIG. 10 is a cross-sectional top plan view of the head taken along line D-D of FIG. 1 showing CW powered rotation of the head.
Figure 13D:
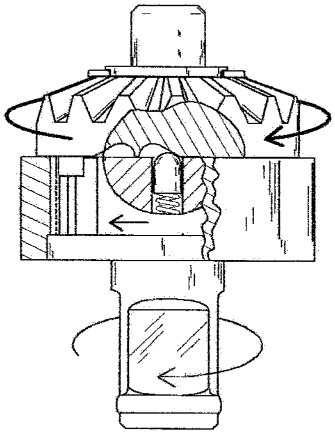
FIG. 13*d* is a partially fragmented left side sectional elevation view of the ratchet assembly taken along line A-A of FIG. 3 for powered CW rotation and corresponds to FIG. 10.

As shown in FIG. 10 and FIG. 13*d*, reversing the driving member 90 reverses the rotational drive direction of the pawl positioner 92 from CCW to CW. Still under this powering mode, the pawl positioner 92 rotates CW through a lost-motion acute arc while simultaneously forcing the releasable tension pin 44 out of the first slot 20*a* and into the distal end of second slot 20*b*. As the pawl positioner 92 rotates CW, the right side wedge face 18*b* of the pawl positioner 92 contacts the right side pawl tang face 75 of the pawl 34, which forces the pawl 34 radially inward as the right side pawl abutment 56 of the pawl 34 is forced against the right side eccentric pocket wall 32*b* of the body 84. This forces the pawl 34 radially inward and disengaged from the internal gear 30. Continued rotation of the pawl positioner 92 CW forces rotation of the head 28 CW once the parallel bowtie flats 60*b* contact the Double-D flats of the upper shaft 62.

Manual Clockwise Rotation

Figure 11:
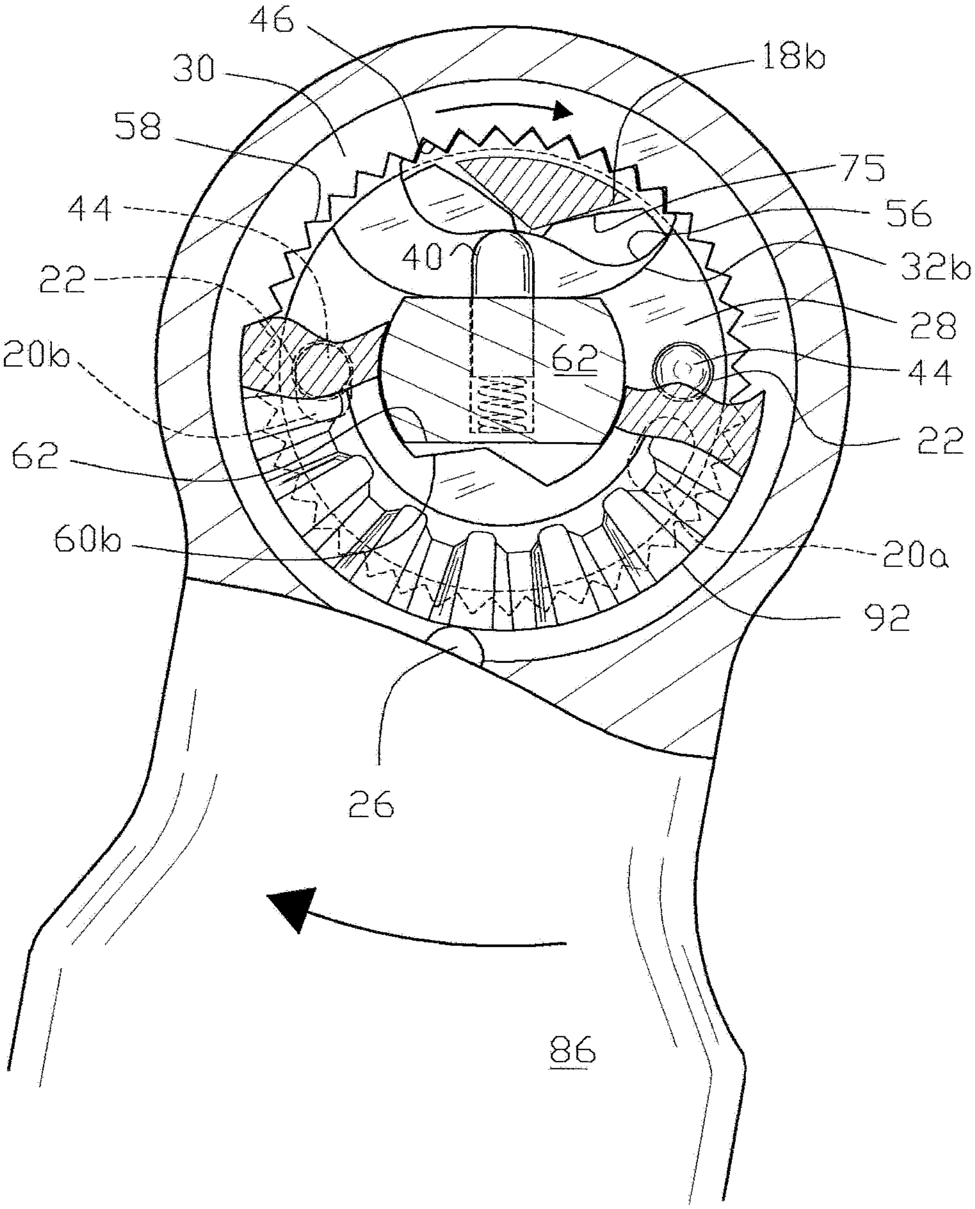
FIG. 11 is a cross-sectional top plan view of the head taken along line D-D of FIG. 1 showing CW manual rotation of the head.
Figure 13E:
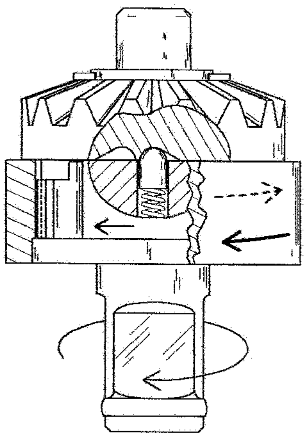
FIG. 13*e* is a partially fragmented left side sectional elevation view of the ratchet assembly taken along line A-A of FIG. 3 for manual CW driving or CCW ratcheting rotation of the head and corresponds to FIGS. 11 and 12 respectively.

In one embodiment of the presently disclosed technology, when powering mode is stopped, default manual mode immediately becomes available. As shown in FIG. 13*d*, the tension pin 44 is resting on the shallow sloped distal end of the second slot 20*b*. Once the power is discontinued, the mechanism reverts to manual mode as the pawl positioner 92 tends to rotate in an opposite direction from powered (CW) since the releasable tension pin 44 biases toward the deeper proximal end of second slot 20*b*, as shown in FIG. 13*e*. This manual mode is also depicted in FIG. 11, whereby an operator can rotate the head 86 CW for manual CW rotation of the driving head 28 and/or the internal gear 30. Even though the pawl positioner 92 is not powered and drags or follows, its dragging/following friction is not sufficient enough to force the tension pin 44 out of the deep proximal end of the elongated second slot 20*b* and thus teeth engagement of the pawl teeth 46 and internal gear teeth 58 is maintained for rotating the driving head 28 manually CW by the power wrench head 86. As the pawl 34 is carried CW, the load on the right side pawl abutment face 56 is evenly distributed against the right side eccentric pocket wall 32*b*.

Ratcheting Counterclockwise

Figure 12:
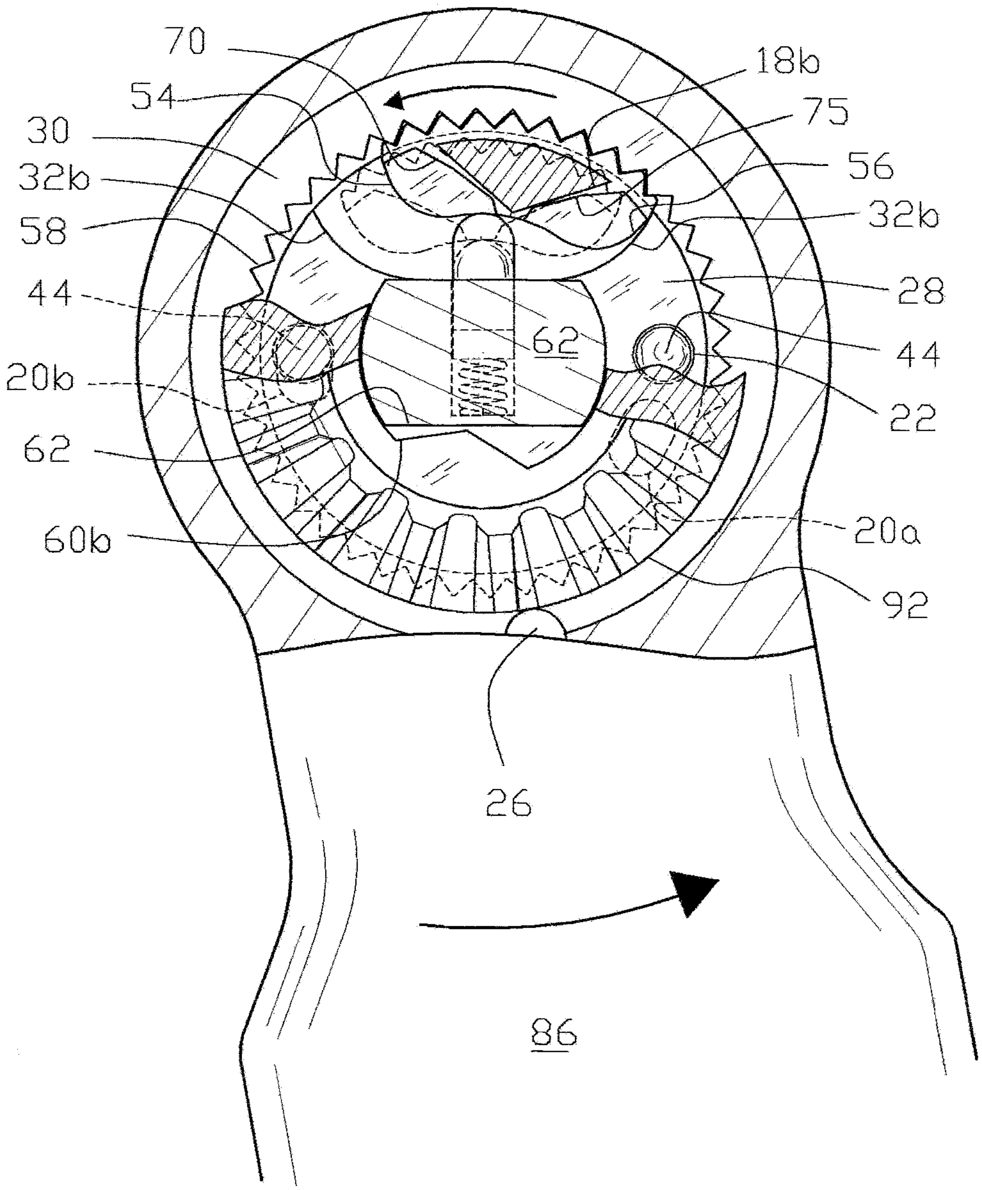
FIG. 12 shows a similar view as that in FIG. 11 where the head is ratcheting CCW.

If manual CW further rotation of the head 86 is obstructed, ratcheting CCW might be needed. To accomplish this, an operator simply rotates the head 86 CCW to effect ratcheting as shown in FIG. 12, which is the opposite of FIG. 9. As the head 86 and/or the internal gear 30 rotate CCW, either or both drag the pawl 34 along. The pawl 34 slides, oscillates, and/or ratchets radially in and out as the head 86 rotates CCW around a substantially still driving head 28.

As CCW rotation of the head 86 continues, the right side wedge face 18*b* of the pawl positioner 92 forces the pawl 34 radially inward at its right side pawl tang face 75 thus sliding inward until the compatible teeth overslide and then reengage or mesh and continued rotation causes the oscillation or desired ratcheting. Further rotation forces the pawl 34 radially inward until the pawl teeth 46 slip over the internal teeth 58 of the internal gear. The pawl 34 is forced radially inward (e.g., oscillates radially in and out) as the right side pawl tang face 75 slides (e.g., to and from, in and out) along the right side wedge face 18*b* of the pawl positioner 92. As shown in FIG. 13*e*, the tension pin 44 rests in the deeper proximal end of the second slot 20*b*. The CW parallel bowtie flats 60*b* and the Double-D flats of the upper shaft 62 are in close proximity but not touching and sufficient clearance is provided between the right side wedge face 18*b* and the right side eccentric pocket wall 32*b* for the right pawl tang 34*b* to extend radially outward into resilient mesh with the internal gear 30.

Based on the above-described features, the presently disclosed technology provided high speed capability since the pawl and internal gear are not engaged during powering. In contrast, full tooth engagement occurs when manually driving.

ALTERNATIVE EMBODIMENTS

Figure 15:
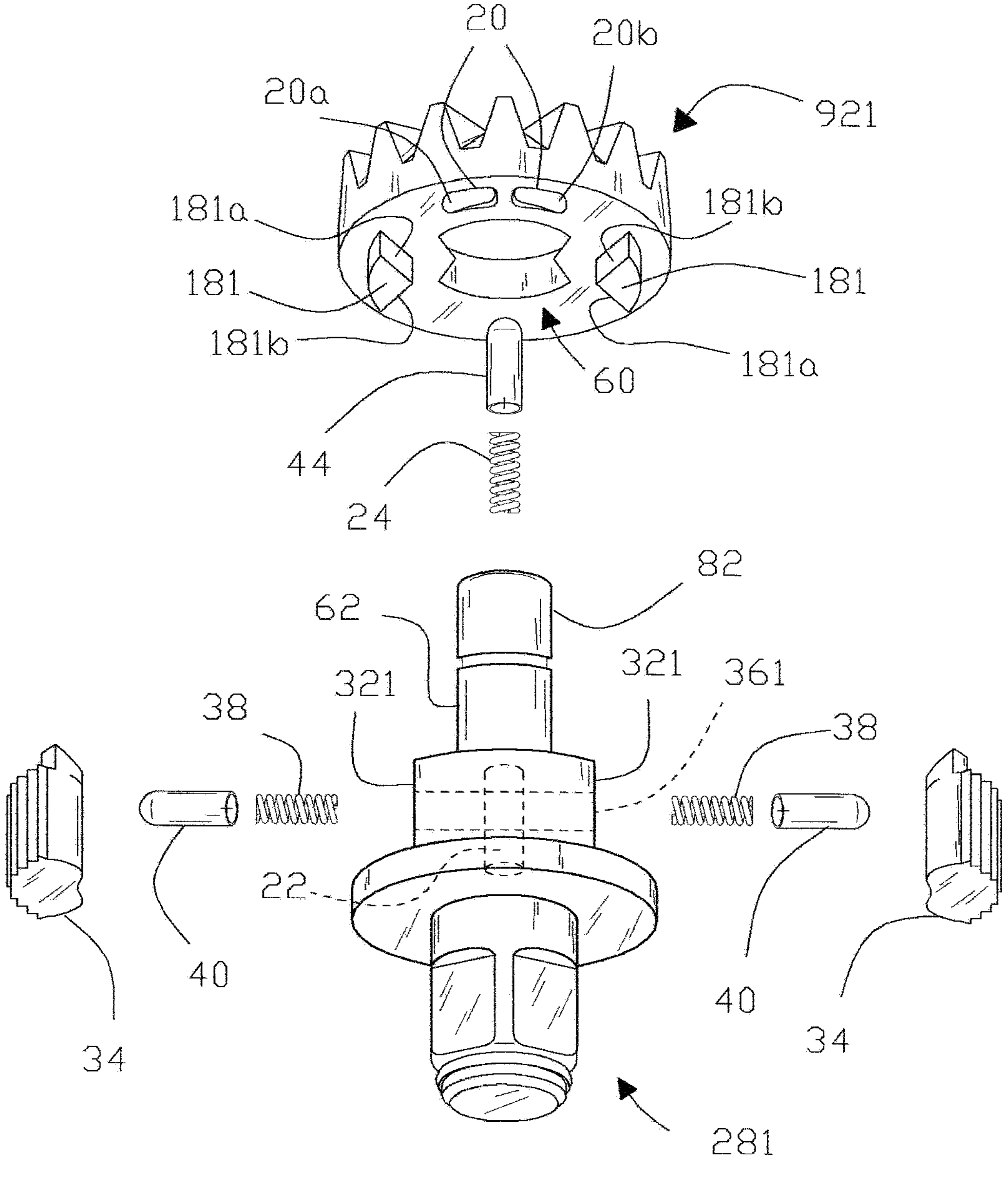
FIG. 15 is an exploded view of one form of an alternative embodiment of elements showing two V-shaped wedges and two pawls and a pair of angularly elongated slots according to the presently disclosed technology.
Figure 16A:
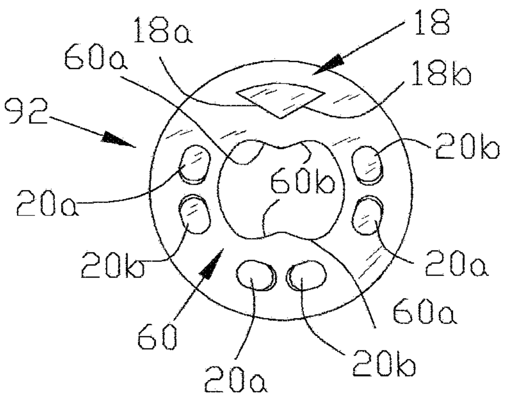
FIG. 16*a* is a bottom plan view of another embodiment of a pawl positioner taken along line C-C of FIG. 1 showing three pairs of angularly elongated slots.
Figure 16B:
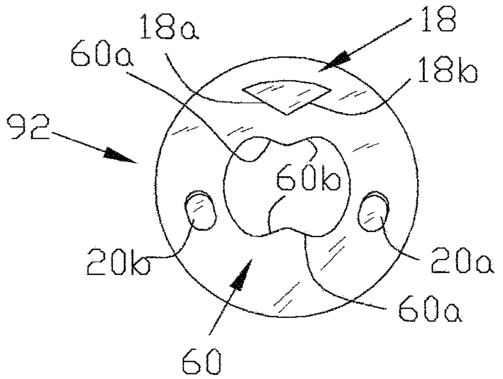
FIG. 16*b* is a bottom plan view of yet another embodiment of the pawl positioner taken along line C-C of FIG. 1 showing a pair of elongated slots substantially opposite each other on the lower side of the counterbore.
Figure 16C:
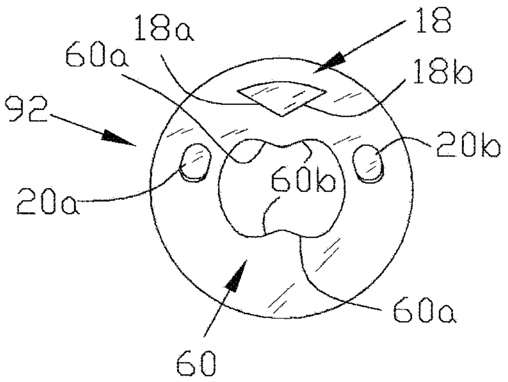
FIG. 16*c* is a bottom plan view of still another embodiment of the pawl positioner taken along line C-C of FIG. 1 showing a pair of elongated slots substantially opposite each other on the upper side of the counterbore.
Figure 16D:
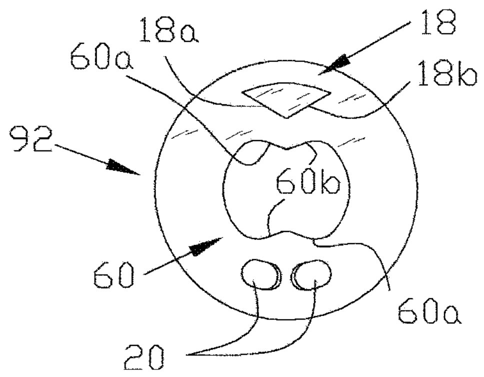
FIG. 16*d* is a bottom plan view of a further embodiment of the pawl positioner taken along line C-C of FIG. 1 having a pair of elongated slots diametrically opposite the V-wedge.

Although the aforementioned details present a ratchet mechanism, one or more alternative embodiments can achieve the same or similar results. FIG. 15 exemplifies one of those embodiments in keeping with the broader aspect of the present disclosure. Similar or identical structure as between the embodiment of FIGS. 1-14*b* and the embodiment of FIG. 15 is distinguished in FIG. 15 by a reference number with a magnitude one hundred (100) greater than that of FIGS. 1-14*b*. Description of certain similarities between the embodiment of FIGS. 1-14*b* and the embodiment of FIG. 15 may be omitted herein for convenience and brevity only.

Referring to FIG. 15, a pawl positioner 921 is shown with at least one wedge 181 and more particularly two spaced-apart wedges 181*a*, 181*b*, optionally each having a V-shape, extending downwardly from a planar bottom surface thereof and one angularly elongated first slot 20*a* for CCW rotation and one angularly second slot 20*b* for CW rotation. A driving head 281 can include two eccentric pockets or depressions 321 for loosely carrying two ratcheting pawls 34 manipulated by the wedges 181. Pawl pins 40 can be biased tensionaly by a biasing element 38 each protruding from a transverse aperture 361 forcing each pawl pin 44 into the inner periphery 42 of each pawl 34. Tension pin biasing member 24 can bias releasable tension pin 44 against either first slot 20*a* or second slot 20*b*. The pawl pin 44 and tension pin biasing member 24 can protrude from a vertical aperture 22 in the driving head 281.

FIGS. 16*a*-*d* show alternative embodiments of the pawl positioner 92 discussed in detail above. The pawl positioner 92 shown in FIGS. 16*a*-*d* is substantially similar to those shown in FIGS. 1-15 above. As such, similar or identical features between the embodiments are identified by the same reference numeral. Only certain distinctions between the embodiments will be discussed herein for the sake of brevity and convenience only, which is not limiting or an implication that a certain feature or component is not present in this embodiment. As shown in FIGS. 16*a*-*d*, the pawl positioner 92 can include a mix of components that allow the presently disclosed technology to accomplish the same functionality discussed above in a different manner.

FIGS. 17*a*-*d* show an alternative embodiment of the upper shaft 62 and the pawl positioner 92. Components shown in FIGS. 17*a*-*d* are substantially similar to those shown in FIGS. 1-15 above. As such, similar or identical features between the embodiments are identified by the same reference numeral. Only certain distinctions between the embodiments will be discussed herein for the sake of brevity and convenience only, which is not limiting or an implication that a certain feature or component is not present in this embodiment.

Figure 17A:
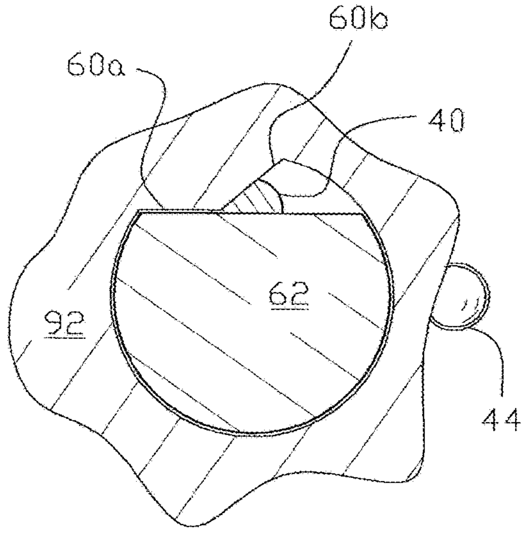
FIG. 17*a* is a magnified partially fragmented plan view of certain internal components of the head taken along line E-E of FIG. 4 showing the mechanism powering CCW and corresponding to FIG. 7.
Figure 17B:
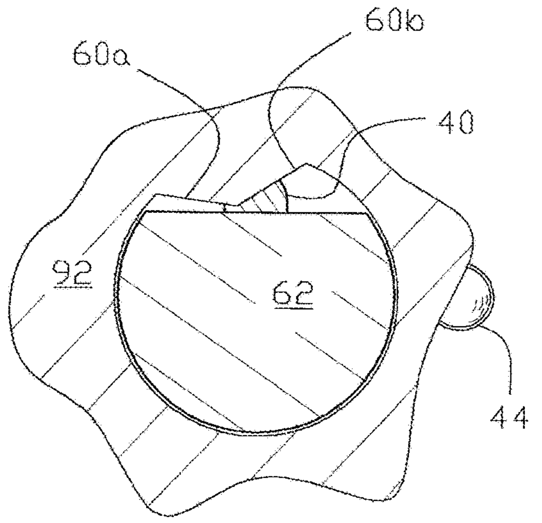
FIG. 17*b* is a view similar to FIG. 17*a* showing the components positioned for manual CCW rotation or CW ratcheting rotation of the head and corresponding to FIGS. 8 and 9.
Figure 17C:
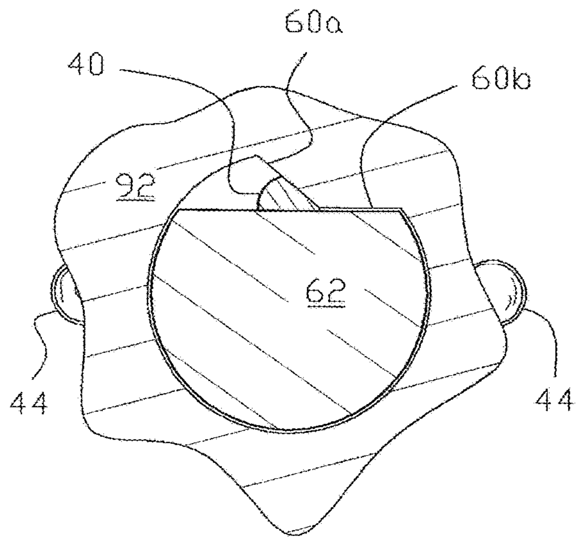
FIG. 17*c* is a view similar to FIG. 17*a* showing the components powering CW and corresponding to FIG. 10.
Figure 17D:
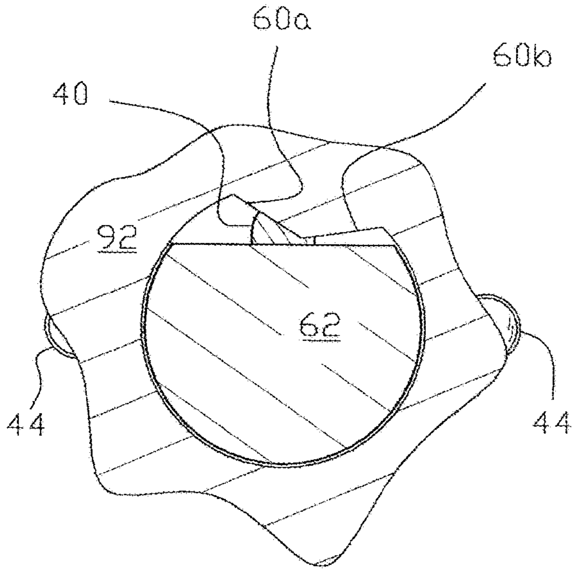
FIG. 17*d* is a view similar to FIG. 17*a* showing the components positioned for manual CW rotation or CCW ratcheting rotation of the head and corresponding to FIGS. 11 and 12.

As shown in FIGS. 17*a*-*d*, a portion thereof is in a Single-D configuration or has one flat surface and a remainder of a perimeter being curved or arcuate. In turn, the pawl positioner 92 can include a circular counterbore having a CCW flat 60*a* and a CW flat 60*b*. FIG. 17*a* shows the mechanism powering CCW. FIG. 17*b* shows the mechanism positioned for manual CCW rotation or CW ratcheting. FIG. 17*c* shows the mechanism powering CW. FIG. 17*d* shows the mechanism position for manual CW rotation or CCW ratcheting.

As can be appreciated from the above disclosure, the presently disclosed technology provides numerous benefits. For example, in one optional embodiment, the presently disclosed technology provides the benefits of a manual or power ratchet (e.g., manual reverse and/or slower speeds (e.g., 175-300 rpm)) with those of an impact wrench (e.g., no whipping effect and/or faster speeds). Prior art manual or power ratchets are subject to the "whipping" effect, which the presently disclosed technology is not, such as when the head is used in conjunction with an impact clutch. In other words, one embodiment of the presently disclosed technology combines speed with the benefits of a reverse ratchet.

Optionally, in one embodiment, the presently disclosed technology can ratchet when impact is overcome, and/or can ratchet when impact is insufficient. Additionally or alternatively, one embodiment of the presently disclosed technology can be more precise with work piece turning, which can result in less damage to the operator/user, the tool, and the work piece. For this reason, there is no limitation to the type of work piece that can be used or manipulated, as the work piece could be formed of aluminum, PLEXIGLASS™, or other relatively soft materials.

In one embodiment, the presently disclosed technology is only in powering mode when the trigger of the tool is pulled or engaged. Unless the trigger is pulled or engaged, in such an embodiment the tool is in manual mode, where ratcheting is possible. Optionally, manual and powering mode rotate in the same direction, and ratcheting rotates in the opposite direction.

In one optional embodiment, the pawl is located at least slightly vertically below the pawl positioner. Such positioning has been found to ensure smooth operation of the components.

While the presently disclosed technology has been described in detail and with reference to specific examples thereof, it will be apparent to one skilled in the art that various changes and modifications can be made therein without departing from the spirit and scope thereof. It is understood, therefore, that the presently disclosed technology is not limited to the particular embodiments disclosed, but it is intended to cover modifications within the spirit and scope of the presently disclosed technology as defined by the appended claims.

What I claim is:

1. An auto-reverse ratchet mechanism of a tool head, the mechanism comprising:

a driving member extending along a first longitudinal axis, the driving member being configured to be driven by a motor or other power source;

a driving head extending along a second longitudinal axis, the first longitudinal axis extending transversely to the second longitudinal axis, the driving member being configured to operatively connect to the driving head;

a pawl positioner surrounding and receiving a portion of the driving head therein, the pawl positioner being fixedly attached to the driving head;

an internal gear including teeth extending toward an interior thereof, the internal gear surrounding a portion of the driving head, the internal gear being fixed or integral with respect to the tool head; and a pawl including a plurality of teeth selectively engageable with the teeth of the internal gear, the pawl being urged radially outward toward the internal gear, wherein the mechanism is configured to operate in a manual mode and a powering mode, in the powering mode the pawl and internal gear being maintained in a disengaged configuration, in the manual mode the pawl and the internal gear being engaged, and wherein the pawl positioner automatically completely disengages the pawl relative to the driving head when a rotational drive direction of the tool head is reversed from the manual mode to the powering mode.

2. The mechanism of claim 1, wherein the pawl is urged radially outward by a biasing member pushing a pin out of a recess in the driving head and into an inner periphery of the pawl.

3. The mechanism of claim 2, wherein the pin extends transversely to the second longitudinal axis.

4. The mechanism of claim 1, wherein the pawl positioner includes a central bore having an eccentric shape.

5. The mechanism of claim 4, wherein the driving head includes an upper shaft having two opposing flat sides and two opposing arcuate sides.

6. The mechanism of claim 1, wherein reversing the driving member reverses a rotational direction of the pawl positioner from counterclockwise to clockwise and vice versa.

7. The mechanism of claim 1, wherein the pawl positioner includes at least one elongated slot on a bottom surface thereof.

8. The mechanism of claim 7, wherein the at least one elongated slot is a pair of angularly elongated slots, and wherein one of the slots is configurated for counterclockwise rotation and the other of the slots is configured for clockwise rotation.

9. The mechanism of claim 8, wherein one or more releasable tension pins is urged upwardly from a portion of the driving head by a tension pin biasing member out of an aperture in the driving head and into one of the slots for counterclockwise or clockwise rotation.

10. The mechanism of claim 1, wherein both the first slot and the second slot are elongated.

11. The mechanism of claim 1, wherein the pawl and the internal gear disengage when the mechanism is in the powering mode.

12. The mechanism of claim 11, wherein the mechanism defaults to the manual mode when not in the powering mode, and wherein a driving direction is the same in the manual mode and the powering mode.

13. The mechanism of claim 1, wherein the driving member is operatively connected to and configured to be driven by a motor.

14. The mechanism of claim 1, wherein the pawl positioner includes a projection extending outwardly or downwardly therefrom and into a pocket of the driving head such that the pawl positioner and the driving head rotate in unison.

15. The mechanism of claim 1, wherein the plurality of teeth extend evenly along the entire outer surface of the pawl.

16. A ratchet mechanism of a tool head, the mechanism comprising:

a driving member extending along a first longitudinal axis, the driving member being configured to be driven by a motor or other power source;

a driving head extending along a second longitudinal axis, the first longitudinal axis extending transversely to the second longitudinal axis, the driving member being configured to operatively connect to the driving head;

a pawl positioner surrounding and receiving a portion of the driving head therein, the pawl positioner being fixedly attached to the driving head; and a pawl including a plurality of teeth selectively engageable with teeth of the tool head, the pawl being urged radially outward toward the teeth of the tool head by a biasing member pushing a pin away from the driving head and into an inner periphery of the pawl, wherein the pawl positioner automatically completely disengages the pawl relative to the driving head when a rotational drive direction of the driving member is reversed from a manual mode to a powering mode.

17. The mechanism of claim 16, in the powering mode the pawl and the teeth of the tool head being maintained in a disengaged configuration, in the manual mode the pawl and the teeth of the tool head being configured to engage.

18. A ratchet mechanism of a reversible tool head, the mechanism comprising:

a driving member extending along a first longitudinal axis, the driving member being configured to be driven by a motor or other power source;

a driving head extending along a second longitudinal axis, the first longitudinal axis extending transversely to the second longitudinal axis, the driving member being configured to operatively connect to the driving head;

a pawl positioner surrounding and receiving a portion of the driving head therein, the pawl positioner being fixedly attached to the driving head; and a pawl including a plurality of teeth selectively engageable with teeth of the tool head, the pawl being urged radially outward toward the teeth of the tool head by a biasing member pushing a pin away from the driving head and into an inner periphery of the pawl, wherein the pawl positioner is configured to automatically completely disengage the pawl relative to the driving head when a rotational drive direction of the driving member is reversed from a manual mode to a powering mode.

19. The mechanism of claim 18, wherein in the powering mode the pawl and the teeth of the tool head are maintained in a disengaged configuration, in the manual mode the pawl and the teeth of the tool head being configured to engage.

* * * * *